US00RE34962E

United States Patent [19]

Shekleton et al.

[11] E Patent Number: Re. 34,962

[45] Reissued Date of Patent: Jun. 13, 1995

[54] ANNULAR COMBUSTOR WITH TANGENTIAL COOLING AIR INJECTION

[75] Inventors: Jack R. Shekleton; Colin Rodgers, both of San Diego; John P. Archibald, LaJolla; Robert W. Smith, Lakeside, all of Calif.

[73] Assignee: Sundstrand Corporation, Rockford, Ill.

[21] Appl. No.: 890,916

[22] Filed: May 29, 1992

Related U.S. Patent Documents

Reissue of:

[64] Patent No.: 4,928,479
Issued: May 29, 1990
Appl. No.: 138,342
Filed: Dec. 28, 1987

[51] Int. Cl.[6] ..... F02C 3/08

[52] U.S. Cl. ..... 60/39.36; 60/746; 60/755; 60/756; 60/760

[58] Field of Search ..... 60/743, 746, 748, 755, 60/756, 757, 758, 759, 760, 394.36, 737, 738, 740

[56] References Cited

U.S. PATENT DOCUMENTS

| | | | |
|---|---|---|---|
| 2,638,745 | 5/1953 | Nathan | 60/748 |
| 3,099,134 | 7/1963 | Calder et al. | 60/752 |
| 3,169,369 | 2/1965 | Holl | 60/748 |
| 3,352,106 | 11/1967 | Pianko | 60/755 |
| 3,520,134 | 7/1970 | Cripe et al. | 60/758 |
| 3,613,360 | 10/1971 | Howes | 60/39.36 |
| 3,691,766 | 9/1972 | Champion | 60/746 |
| 3,788,065 | 1/1974 | Markowski | 60/39.36 |
| 3,793,827 | 2/1974 | Ekstedt | 60/759 |
| 3,811,277 | 5/1974 | Markowski | 60/746 |
| 3,869,864 | 3/1975 | Bunn | 60/760 |
| 4,006,589 | 2/1977 | Schirmer | 60/748 |
| 4,302,941 | 12/1981 | Dubell | 60/757 |
| 4,361,010 | 11/1982 | Tanrikut et al. | 60/760 |
| 4,404,806 | 9/1983 | Bell, III et al. | 60/743 |
| 4,429,538 | 2/1984 | Sato et al. | 60/748 |
| 4,507,075 | 3/1985 | Buss et al. | 431/115 |

FOREIGN PATENT DOCUMENTS

| | | | |
|---|---|---|---|
| 762596 | 11/1956 | United Kingdom | 60/757 |
| 1060095 | 2/1967 | United Kingdom | 60/757 |

*Primary Examiner*—Timothy S. Thorpe
*Attorney, Agent, or Firm*—Wood, Phillips, VanSanten, Hoffman & Ertel

[57] ABSTRACT

The combustion dynamics and efficiency of gas turbine having an annular combustor 26 provided with fuel injection nozzles 50 that inject fuel generally tangentially is improved by providing the walls 32, 34, 39 of the combustion 26 with cooling air film injectors 70, 86; 72, 88; 74, 90 at substantially equally angularly spaced locations about each such wall and which are oriented to generally tangentially inject a film-like air stream on the associated wall 32, 34, 39.

15 Claims, 1 Drawing Sheet

ANNULAR COMBUSTOR WITH TANGENTIAL COOLING AIR INJECTION

Matter enclosed in heavy brackets [ ] appears in the original patent but forms no part of this reissue specification; matter printed in italics indicates the additions made by reissue.

*This application is a a reissue of Ser. No. 07/138,342 filed Dec. 28, 1987, now U.S. Pat. No. 4,928,479.*

FIELD OF THE INVENTION

This invention relates to gas turbines, and more particularly, to an improved combustor for use in gas turbines.

BACKGROUND OF THE INVENTION

It has long been known that achieving uniform circumferential turbine inlet temperature distribution in gas turbines is highly desirable. Uniform distribution minimizes hot spots and cold spots to maximize efficiency of operation as well as prolongs the life of those parts of the turbine exposed to hot gasses.

To achieve uniform turbine inlet temperature distribution in gas turbines having annular combustors, one has had to provide a large number of fuel injectors to assure that the fuel is uniformly distributed in the combustion air. Fuel injectors are quite expensive with the consequence that the use of a large number of them is not economically satisfactory. Moreover, as the number of fuel injectors increases in a system, with unchanged fuel consumption, the flow area for fuel in each injector becomes smaller. As the fuel flow passages become progressively smaller, the injectors are more prone to clogging due to very small contaminants in the fuel.

This in turn creates the very problem sought to be done away with through the use of a number of fuel injectors. In particular, a fouled fuel injector will result in a non uniform turbine inlet temperature in an annular combustor with the result that hot and cold spots occur.

To avoid this difficulty, the prior art has suggested that by and large axial injection using a plurality of injectors be modified to the extent that such injectors inject the fuel into the annular combustion chamber with some sort of tangential component. The resulting swirl of fuel and combustion supporting gas provides a much more uniform mix of fuel with the air to provide a more uniform burn and thus achieve more circumferential uniformity in the turbine inlet temperature. However, this solution deals only with minimizing the presence of hot and/or cold spots when one or more injectors plug and does not deal with the desirability of eliminating a number of fuel injectors to reduce cost and/or avoiding the use of injectors having very small fuel flow passages which are prone to clogging.

The present invention is directed to overcoming one or more of the above problem.

SUMMARY OF THE INVENTION

It is the principal object of the invention to provide a new and improved annular combustor for a gas turbine. More specifically, it is an object of the invention to provide such a combustor wherein the number of fuel injectors may be minimized and yet uniform circumferential turbine inlet temperature distribution retained along with a minimization the possibility of the fuel injectors plugging.

An exemplary embodiment of the invention achieves the foregoing objects in a gas turbine including a rotor having compressor blades ana turbine blades. An inlet is located adjacent one side of the compressor blades and a diffuser is located adjacent the other side of the compressor blades. A nozzle is disposed adjacent the turbine blades for directing hot gasses at the turbine blades to cause rotation of the rotor and an annular combustor having spaced radially inner and outer, axially extending wails connected by a radially extending wall is disposed about the rotor and has an outlet connected to the nozzle and a primary combustion annulus remote from the outlet. A plurality of fuel injectors to the primary combustion annulus are provided and are substantially equally angular spaced about the same. They are configured to inject fuel into the primary combustion annulus in a nominally tangential direction. Cooling air for one or more of the walls of the annular combustor is introduced tangentially in a film-like fashion along the interior side or sides of one or more of the combustor walls. The use of a tangentially flowing film of cooling air serves to reduce the tendency of injected fuel from moving in the axial direction allowing complete evaporation within the primary combustion annulus to increase operational efficiency. In addition, annular momentum of the air stream from the compressor is conserved to reduce the overall pressure loss and again increase in operational efficiency.

Injection of air for film cooling is accomplished through the use of cooling air openings in one or more of the walls of the annular combustor.

Where the air film injection is accomplished through the radially inner and/or radially outer walls of the combustor, it is preferably accomplished through the provision of a plurality of axially extending rows of openings while cooling air film injection through the radially extending wall of the combustor is accomplished through the use of radially extending rows of openings.

In either case, elongated cooling strips having a shape somewhat akin to that of a flattened "S" are utilized. The cooling strips have one edge secured to the corresponding wall of the annular combustor and the opposite edge spaced therefrom. The opposite edges overlie corresponding ones of the rows of cooling air openings and in the case of the radially inner and outer walls are axially directed and in the case of the radially extending wall are generally radially directed. The opposite edges are downstream in the direction of swirl within the annular combustor from the edges that are attached to the respective walls. As a consequence, air enter the combustor through the cooling air opening is directed by the cooling strip in the tangential direction and in close proximity to the associated wall to thereby generate the cooling air firm.

According to a preferred embodiment, the cooling air openings are in fluid communication with the diffuser to receive compressed air therefrom.

In a highly preferred embodiment, the fuel injectors comprise fuel nozzles having ends within the primary combustion annulus and air atomizing nozzles for the combustion supporting air surround each of the ends of the fuel injector fuel nozzles.

The invention contemplates the use of a compressed air housing surrounding the combustor in spaced relation thereto and in fluid communication with the diffuser. The cooling air openings open to the interface of the housing and combustor to receive compressed air therefrom.

Other objects and advantages will become apparent from the following specification taken in connection with the accompanying drawings.

DESCRIPTION OF THE PREFERERD EMBODIMENT

Figure 1:
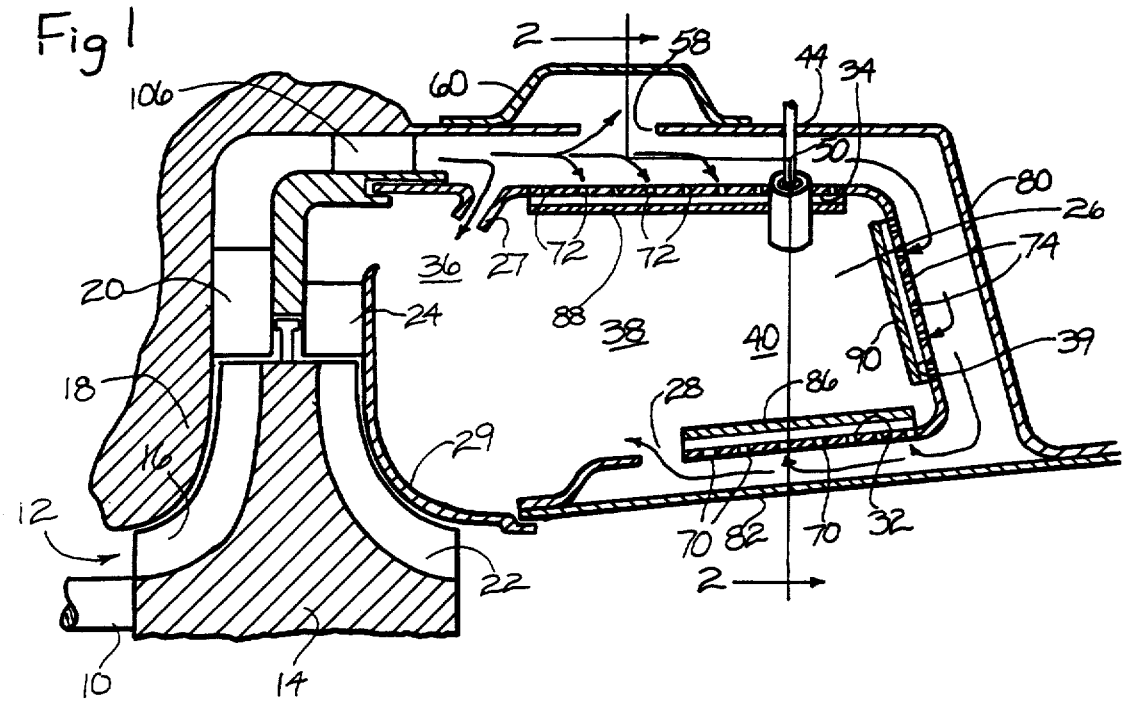
FIG. 1 is a somewhat schematic, fragmentary, sectional view of a turbine made according to the invention.

An exemplary embodiment of a gas turbine made according to the invention is illustrated in the drawings in the form of a radial flow gas turbine. However, the invention is not so limited, having applicability to any form of turbine or other fuel cornbusting device requiring an annular combustor.

The turbine includes a rotary shaft 10 journalled by bearings not shown. Adjacent one end of the shaft 10 is an inlet area 12. The shaft 10 mounts a rotor, generally designated 14 which may be of conventional construction. Accordingly, the same includes a plurality of compressor blades 16 adjacent the inlet 12. A compressor blade shroud 18 is provided in adjacency thereto and just radially outwardly of the radially outer extremities of the compressor blades 18 is a conventional diffuser 20.

Oppositely of the compressor blades 16, the rotor 14 has a plurality of turbine blades 22. Just radially outwardly of the turbine blades 22 is an annular nozzle 24 which is adapted to receive hot gasses of combustion from a combustor, generally designated 26. The compressor system including the blades 16, shroud 18 and diffuser 20 delivers compressed air to the combustor 26, and via dilution air passages 27 and 28, to the nozzle 24 along with the gasses of combustion. That is to say, hot gasses of combustion from the combustor 26 are directed via the nozzle 24 against the blades 22 to cause rotation of the rotor 14 and thus the shaft 10. The latter may be, of course, coupled to some sort of apparatus requiring the performance of useful work.

A turbine blade shroud 29 is interfitted with the combustor 26 to close off the flow path from the nozzle 24 and confine the expanding gas to the area of the turbine blades 22.

The combustor 26 has a generally cylindrical inner wall 32 and a generally cylindrical outer wall 34. The two are concentric and merge to a necked down area 36 which serves as an outlet from the interior annulus 38 of the combustor to the nozzle 24. A third wall 39, generally radially extending and concentric with the walls 32 and 34, interconnects the same to further define the annulus 38.

Oppositely of the outlet 36, and adjacent the wall 39, the interior annulus 38 of the combustor 26 includes a primary combustion zone 40. By primary combustion zone, it is meant that this is the area in which the burning of fuel primarily occurs. Other combustion may, in some instances, occur downstream from the primary combustion area 40 in the direction of the outlet 36. As mentioned earlier, provision is made for the injection of dilution air through the passageways 27 and 28 into the combustor 26 downstream of the primary combustion zone 40 to cool the gasses of combustion to a temperature suitable for application to the turbine blades 22 via the nozzle 24. It should be noted that the passageways 27 and 28 are configured so that the vast majority of dilution air flow into the combustor 26 occurs through the passageways 28. This, of course, requires the vast majority of dilution air to pass about the generally radially outer wall 34, the third wall 39 and the radially inner wall 32 which in turn provides excellent convective cooling of these combustor walls and avoids the formation of hot spots on any of the walls 32, 34 and 39.

In any event, it will be seen that the primary combustion zone 40 is an annulus or annular space defined by the generally radially inner wall 32, the generally radially outer wall 34 and the wall 39.

A further wall 44 is generally concentric to the walls 32 and 34 and is located radially outwardly of the latter. The wall 44 extends to the outlet of the diffuser 20 and thus serves to contain and direct compressed air from the compressor system to the combustor 26.

Figure 2:
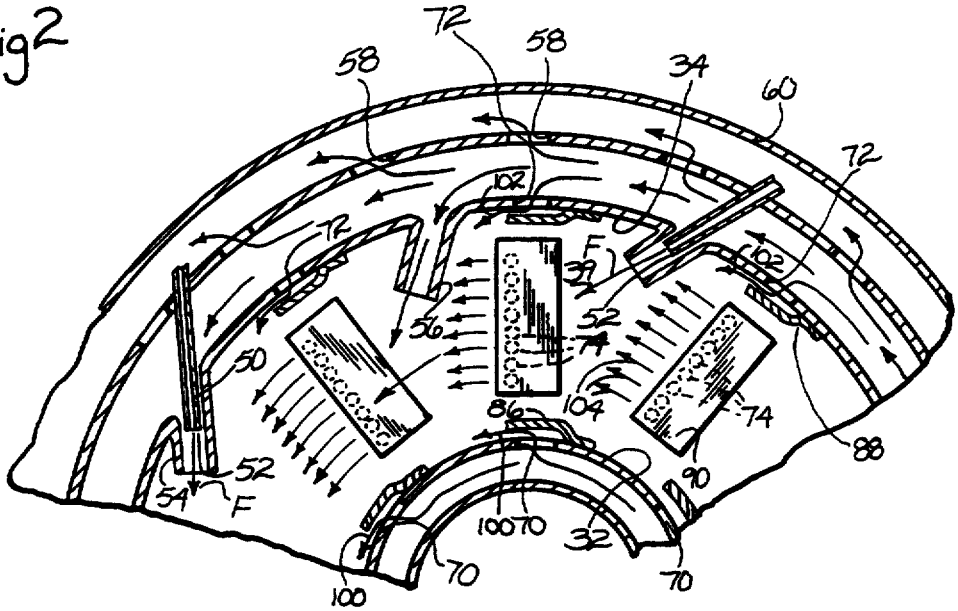
FIG. 2 is a fragmentary sectional view taken approximately along the line 2—2 in FIG. 1.

As best seen in FIG. 2, the combustor 26 is provided with a plurality of fuel injection nozzles 50. The fuel injection nozzles 50 have ends 52 disposed within the primary combustion zone 40 and which are configured to be nominally tangential to the inner wall 32. The fuel injection nozzles 50 generally but not necessary utilize the pressure drop of fuel across swirl generating orifices (not shown) to accomplish fuel atomization. Tubes 54 surround the nozzles 50. High velocity air from the compressor flows through the tubes 54 to enhance fuel atomization. Thus the tubes 54 serve as air injection tubes. When swirl generating orifices are not used as in the embodiment illustrated, high velocity air flowing through the tubes 34 is the means by which fuel exiting the nozzles 50 is atomized.

The fuel injecting nozzles 50 are equally angularly spaced about the primary combustion annulus 40 and optionally disposed between each pair of adjacent nozzles 50 there may be a combustion supporting air jet 56. When used, the jets 56 are located in the wall 34 and establish fluid communication between the air delivery annulus defined by the walls 34 and 44 and the primary combustion annulus 441. These jets 56 may be somewhat colloquially termed "bender" jets as will appear. They are also oriented so that the combustion supporting air entering through them enters the primary combustion annulus 40 in a direction nominally tangential to the inner wall 32.

Preferably the injectors 50 and jets 56 are coplanar or in relatively closely spaced planes remote from the outlet area 36. Such plane or planes are transverse to the axis of the shaft 10.

When the intended use of the engine requires the delivery of large quantities of bleed air, the wall 44 is provided with a series of outlet openings 58 which in turn are surrounded by a bleed air scroll 60 secured to the outer surface of the wall 44. Thus, bleed air to be used for conventional purposes may be made available at an outlet (not shown) from the scroll 60.

To prevent the formation of undesirable hot spots on the walls 32, 34 and 39 for any of a variety of reasons, the invention contemplates the provision of means for flowing a cooling air film over the walls 32, 34 and 39 on the surfaces thereof facing the annulus 38. Further, the invention provides means whereby the cooling air film is injected into the annulus 38 in a generally tangential, as opposed to axial, direction.

Preferably, the injection is provided along each of the walls 32, 34 and 39 but in some instances, such injection may occur on less than all of such walls as desired.

In the case of the radially inner wall 32, the same is provided with a series of apertures 70. Preferably, the apertures 70 are arranged in a series of equally angularly spaced, generally axially extending rows. Thus, the three apertures 70 shown in FIG. 2 constitute one aperture in each of three such rows while the apertures 70 illustrated in FIG. 1 constitute the apertures in a single such row.

A similar senes of equally angularly spaced, axially extending rows of apertures 72 is likewise provided in the wall 34.

Similarly, in the case of the wall 39, there are a series of generally radially extending rows of apertures 74. As can be readily appreciated, the apertures 70, 72 and 74 establish fluid communication between the annulus defined by the wall 44 and the wall 34, a radially extending annulus defined by the wall 39 and a wall 80 connected to the wall 44, and the connecting annulus defined by the wall 32 and a connecting wall 82.

Thus tangential and film-like streams of cooling air enter the annulus 38 through the openings 70, 72 and and cooling strips 86, 88, and 90 are applied respectively to the walls 32, 34 and 39.

As a consequence of this construction, the air flowing in the annuli about the combustor 26 will remove heat therefrom by external convective cooling of the walls 32, 34 and 39. Similarly the cooling air film on the sides of the walls 32, 34 and 39 fronting the annulus 38 resulting from film-like air flow into the annulus 38 through the apertures 70, 72 and 74 minimizes the input of heat from the flame within the combustor 26 to the walls 32, 34 and 39.

Thus, in the preferred embodiment, the entirety of the internal surface of all of the walls, 32, 34 and 39 is completely covered with a film of air. The ability to completely cool the internal walls of a combustor is difficult to accomplish, particularly as combustor size decreases. However, utilizing the novel technique of tangential injection of air as herein disclosed readily accomplishes the establishment of a complete wall covering film to provide improved wall cooling. The film further serves to minimize carbon build-up and the elimination of hot spots on the combustor walls.

These advantages are enhanced by reason of the jets of air which result from air flow through the apertures 70, 72 and 74. Such jets of air impact upon the cooling strips to cool them. The cooling strips 86, 88 and 90 are further cooled by the aforementioned film of air flowing over them. The cooling strips also act as a local barrier to convective and radiative heating of the walls 32, 34 and 39 by the flame burning within combustor 26.

The cooling strips 86, 88 and 90 are generally similar one to the other and accordingly, it is believed that a complete understanding of the operation of the same can be achieved simply from understanding the operation of one. Thus, only the cooling strip 86 will be described.

Figure 3:
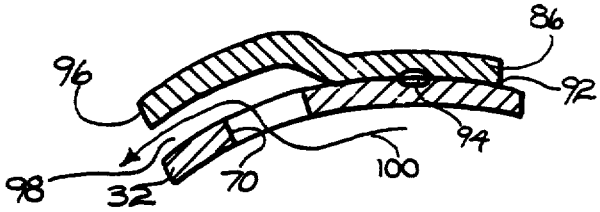
FIG. 3 is a fragmentary enlarged sectional view of a cooling strip that may be used in the invention.

With reference to FIG. 3, the cooling strip 86 is seen to be in the shape of a generally flattened "S" having an upstream edge 92 bonded to the wall 32 just upstream of a corresponding row of the openings 70 by any suitable means as brazing or, for example, a weld 94. Because of the S shape of the cooling step 86, this results in the opposite or downstream edge 96 being elevated above the opening 70 with an exit opening 98 being present. The exit opening 98 is elongated in the axial direction along with the edge 96 and also opens generally tangentially to the wall 32. Consequently, air entering the annulus 38 through the openings in the direction of arrows 100 (FIGS. 2 and 3) will flow in a film-like fashion in a generally tangential direction along the wall 32 on its interior surface to cool the same. The air flow indicated by arrows 102 in FIG. 2 illustrate the corresponding tangential, film-like flow of cooling air on the interior of the wall 34 while additional arrows 104 in FIG. 2 illustrated a similar, tangential film-like air flow of air entering the openings 74 in the wall 39.

Operation is generally as follows. Fuel emanating from each of the nozzles 50 will enter along a line such as shown at "F". This line will of course be straight and it will be expected that the fuel will diverge from it somewhat. Assuming bender jets 56 are used, as the fuel approaches the adjacent bender jet 56 in the clockwise direction, the incoming air from the diffuser 20 and compressor blades 16 will tend to deflect or bend the fuel stream to a location more centrally of the primary combustion annulus 40 as indicated by the curved line "S". There will, of course, be a substantial generation of turbulence at this time and such turbulence will promote uniformity of burn within the primary combustion annulus 40 and this in turn will result in a uniform circumferential turbine inlet temperature distribution at the nozzle 24 and at radially outer ends of the turbine blades 22. Such uniform turbine inlet temperature distribution is achieved in a combustor made according to the invention utilizing many fewer fuel injecting nozzles 50 than would be required according to prior art teachings. As a result of the invention, and even without the use of the bender jets 56, through the use of tangential fuel injection and cooling film introduction, a combustor made according to the invention will require about half the number of fuel injector nozzles 50 as would a conventional combustor of equal volume. In particular, the two will have approximately the same so-called "pattern factor".

If the bender jets 56 are added without adding nozzles 50, an improvement in pattern factor will be obtained over the conventional combustor.

In any event, resulting elimination of a number of fuel injector nozzles 50 provides a substantial cost savings. Moreover, in engines having an increased combustor volume, a further substantial reduction in the number of fuel injectors by as much as 80% of those required according to conventional practice may be obtained.

It will also be observed that where the number of fuel injections nozzles 50 is halved using the principals of the invention, the fuel flow passages of the remaining fuel injection nozzles, assuming they are cylindrical, can be increased in diameter slightly over 40%. This increase in diameter reduces the possibility of plugging of the fuel injection nozzles 50 to provide a more trouble free apparatus. This characteristic of the invention assumes extreme importance in small engines which utilize small combustors and thus have relatively small fuel flows, particularly at low engine speeds or while starting at high altitudes.

In addition, the injection of cooling air in a film-like manner achieved by means of the openings 70, 72 and 74 and associated cooling strips 86, 88 and 90 further minimizes the possibility of a hot spot on a wall coming into existence and thereby prolongs the life of the apparatus. Significantly, the tangential injection of the cooling air film in the same direction as the swirl within the annulus 38 does not provide an axial impetus to fuel droplets entering the primary combustion zone 40 from the nozzles 50. As a consequence, there is ample time for such fuel to fully and completely vaporize within the primary combustion zone 40 and thereby achieve highly efficient combustion. For example, in one combustor made according to the invention tested at 10% of rated engine speed with a combustor pressure drop of only 0.8 inches of water, a short efficient flame was obtained using No. 2 diesel fuel. In contrast, a conventional annular combustor using conventional swirl air blast inject on would typically be unable to sustain combustion under similar circumstances. Thus, an engine employing the invention is more easily started, a feature that may be particularly critical when high altitude operation is used as, for example, when the engine is used as part of an auxiliary power unit or an emergency power unit. Because a high degree of tangential motion or swirl is found desirable in a turbine made accordingly to the invention, desire vanes such as those somewhat schematically illustrated at 106 in FIG. 1 may be relatively minimal thereby reducing the complexity of the invention. The swirl that is thus permitted conserves the angular velocity of the compressed air as it leaves the diffuser 20 so that the pressure drop is minimized, thereby enhancing operational efficiency. Furthermore, since the turbine nozzle 24 is desire, need to impart swirl to the hot gases directed against the turbine blades 22, the fact that the gases are already swirling as a result of tangential air and fuel injection minimizes the directional change applied to such gases by the nozzle 24 to provide a further increase in efficiency.

At the same time, the use of minimal deswirl vanes 106 allows the initial swirl that is typically imparted to the compressed air by the compressor 16 and diffuser 20 to be retained outside the combustor 26 allowing bleed air, which is commonly obtained from a circumferential vent enclosed by a scroll, to be obtained with a high degree of efficiency.

According to the invention, the combustor is sized by an equation of the form:

$$\text{Required Volume} = K\left[\frac{W_a(T_3 - T_2)}{NR}\sqrt{\frac{T_2}{\Delta P/P}}\right]^{1.5}\frac{D}{H}$$

Where

K is a constant;

$W_a$ is the combustor air flow in pounds per second;

$T_3$ is the turbine inlet temperature in degrees Rankine;

$T_2$ is the combustor inlet temperature in degree Rankine;

$\Delta P/P$ is the combustor pressure drop $\times 100$;

P is the combustor air inlet pressure in psia;

$\Delta P$ is the combustor pressure drop in psia;

D is the mean combustor height in inches;

H is the mean combustor width in inches;

N is the number of fuel injectors; and

R is the engine pressure ratio.

The present invention provides a trade-off between combustor volume and the number of injectors. It is a trade-off that cannot be achieved in conventional combustors. Specifically, in a conventional combustor, the number of injectors is determined generally by the expression $N = \pi D/H$.

If the number of injectors as defined by the preceding equation is reduced, there is a senous increase in turbine inlet hot spots. In one combustor made according to the invention, only four injectors were required whereas normal practice would require about thirteen such injectors. Further, in the combustor made according to the invention, a pattern factor of 0.095 was obtained. The pattern factor is a measure of the uniformity of temperature throughout the combustion area and is defined by the formula $$PF = \frac{T_h - T_3}{T_3 - T_2}$$

where $T_h$ is a temperature of the hottest spot in degrees Rankine.

In any event, the pattern factor of 0.095 obtained in a combustor made according to the invention is twice as good as the pattern factor that would be obtained in normal practice with thirteen injectors.

Further, when one of the fuel injectors in the four injector structure made according to the invention was plugged up to simulate a typical field failure. the pattern factor increased only to 0.11, a negligible increase. Converely, extensive experience in turbine engines has indicated that if one injector plugs up in a conventional combustor, the resulting hot spot will seriously damage or even destroy the turbine engine.

Similarly, when a combustor employing two diametrically opposite injectors with two intermediate bender jets was employed, a pattern factor of 0.2 was obtained. This pattern factor its comparable to that which would be obtained in a conventional combustor utilizing 13 injectors. The improvements in pattern factors along with the ability to tolerate plugging as well as the elimination of a large number of injectors clearly the demonstrates the superiority of the invention.

In addition, in a combustor made according to the invention, a test was run with fuel flowing only out of one injector of the four provided. The injector from which fuel was flowing was the lowermost one and the test was to simulate start-up of the engine at very high altitudes when, due to so-called "manifold head" effects, at low fuel flow rates. Substantially all fuel flows into the combustor through the lowermost injector. The resulting time visually observed spread about the entire combustor and the pattern factor was a tolerable 0.33. Conversely, in a conventional combustor wherein fuel is flowed only through one injector, a very localized of lame with inefficient burning is observed and starting at altitudes is poor.

Thus, in addition to the previously stated advantages, the invention is ideally suited for use in turbine engines, particularly small turbine engines, that may be operated at high altitudes and require starting at such altitudes as well.

We claim:

1. A gas turbine comprising:

a rotor including compressor blades and turbine blades;

an inlet adjacent one side of said compressor blades;

a diffuser adjacent the other side of said compressor blades;

a nozzle adjacent said turbine blades for directing hot gasses at said turbine blades to cause rotation of said rotor;

an annular combustor having radially inner and outer walls connected by a generally radially extending wall about said rotor and having an outlet connected to said nozzle and a primary combustion annulus defined by said walls remote from said outlet, a plurality of fuel injectors to said primary combustion annulus and being substantially equally [angular] *angularly* spaced therearound and configured to inject fuel into said primary combustion annulus in a nominally tangential direction; and means [associated with] *on* each of said walls for injecting a film-like stream of cooling air into said primary combustion annulus in a generally tangential direction.

2. The gas turbine of claim 1 wherein said *cooling air* injection means include cooling air openings in fluid communication with said diffuser to receive compressed gas therefrom.

3. The gas turbine of claim 2 wherein a compressed gas housing surrounds said combustor in spaced relation thereto and is in fluid communication with said diffuser, said cooling air openings extending to the interface of said housing [an] *and said* combustor to receive compressed gas therefrom.

4. The gas turbine of claim 1 wherein said fuel injectors comprise fuel nozzles having ends within said primary combustion annulus, and atomizing nozzles for said combustion supporting gas surrounding said ends.

5. A gas turbine comprising a rotor including compressor blades and turbine blades;

an inlet adjacent one side of said compressor blades:

a diffuser adjacent the other side of said compressor blades:

a nozzle adjacent said turbine blades for directing hot gasses at said turbine blades to cause rotation of said rotor, and an annular combustor about said rotor having an outlet to said nozzle, an inner wall and an outer wall spaced therefrom and a connecting radial wall defining an annular combustion space, a plurality of cooling air film injectors at substantially equally angularly spaced locations about each said wall and oriented to inject a film-like air stream on the associated wall generally tangentially to said annular combustion space.

6. The gas turbine of claim 5 wherein each said cooling air film injector comprises a row of openings in the associated wall and a cooling strip having an edge overlying and spaced from said row.

7. The gas turbine of claim 6 wherein said cooling strips each have a cross section in the shape of a flatted "S".

8. The gas turbine of claim 6 wherein the rows and strips associated with said inner and outer walls extend generally axially.

9. The gas turbine of claim 6 wherein the rows and strips associated with said radial wall extend generally radially.

*10. A gas turbine comprising:*

*a rotary compressor;*

*a rotary turbine wheel mounted for rotation about an axis and coupled to said compressor to drive the same;*

*a nozzle adjacent said turbine wheel for directing hot gases thereat to rotate the same;*

*an annular combustor about said turbine wheel having radially inner and outer walls, a radially extending wall and an outlet connected to said nozzle and opposite said radially extending wall with a primary combustion annulus defined by said walls remote from said outlet: and*

*a plurality of circumferentially spaced fuel injectors adjacent said radially outer wall and having ends disposed in said primary combustion annulus so as to inject fuel thereinto in a direction nominally tangential to said radially inner wall at radii passing through said axis.*

*11. The gas turbine of claim 10 wherein said combustor further includes a plurality of circumferentially spaced air injector tubes mounted on said radially outer wall and oriented to direct air into said primary combustion annulus in a direction nominally tangential to said radially inner wall.*

*12. The gas turbine of claim 11 wherein said fuel injectors are located within at least some of said air injection tubes.*

*13. A gas turbine comprising:*

*a rotary compressor;*

*a rotary turbine wheel mounted for rotation about an axis and coupled to said compressor to drive the same;*

*a nozzle adjacent said turbine wheel for directing hot gases thereat to rotate the same;*

*an annular combustor about said turbine wheel having radially inner and outer walls, a radially extending wall and an outlet connected to said nozzle and opposite said radially extending wall with a primary combustion annulus defined by said walls remote from said outlet;*

*a plurality of circumferentially spaced fuel injectors for injecting fuel into said primary combustion annulus in a nominally tangential direction; and*

*a plurality of circumferentially spaced air injector tubes mounted on said radially outer wall and oriented to direct air into said primary combustion annulus in a direction nominally tangential to said radially inner wall at radii passing through said axis.*

*14. The gas turbine of claim 13 wherein said fuel injectors are located within at least some of said air injection tubes.*

*15. A gas turbine comprising:*

*a rotary compressor;*

*a rotary turbine wheel mounted for rotation about an axis and coupled to said compressor to drive the same;*

*a nozzle adjacent said turbine wheel for directing hot gases thereat to rotate the same about said axis;*

*an annular combustor about said turbine wheel having radially inner and outer walls, a radially extending wall and an outlet connected to said nozzle and opposite said radially extending wall with a primary combustion annulus defined by said walls remote from said outlet;*

*a plurality of circumferentially spaced fuel injectors adjacent said radially outer wall and having ends disposed in said primary combustion annulus so as to inject fuel thereinto in a direction nominally tangential to said radially inner wall at radii passing through said axis;*

*a plurality of circumferentially spaced air injector tubes mounted on said radially outer wall and oriented to direct air into said primary combustion annulus in a direction nominally tangential to said radially inner wall at radii passing through said axis; and*

*at least some of said air injection tubes being in surrounding relation to one of said fuel injector so that air flowing through said air injection tubes assists in atomizing fuel injected by said injectors.*

* * * * *